United States Patent [19]

Siewert et al.

[11] Patent Number: 4,635,497
[45] Date of Patent: Jan. 13, 1987

[54] SINGLE LEVER SHIFT

[75] Inventors: Robert L. Siewert, Benton Harbor; Edmund K. Varnelis, St. Joseph, both of Mich.

[73] Assignee: Clark Michigan Company, Cleveland, Ohio

[21] Appl. No.: 769,120

[22] Filed: Aug. 26, 1985

[51] Int. Cl.$^4$ .............................................. G05G 9/12
[52] U.S. Cl. .................................. 74/473 SW; 74/487; 74/506
[58] Field of Search .............. 74/473 SW, 484 R, 485, 74/486, 487, 506

[56] References Cited

U.S. PATENT DOCUMENTS

| | | | |
|---|---|---|---|
| 757,815 | 4/1904 | Krebs | 74/487 |
| 2,497,930 | 2/1950 | Creson | 74/473 SW |
| 2,861,465 | 11/1958 | Winkle et al. | 74/484 X |
| 3,417,635 | 12/1968 | Day et al. | 74/484 |
| 3,853,109 | 12/1974 | McAdams | 74/473 R |
| 4,297,909 | 11/1981 | Crouse | 74/473 R |

FOREIGN PATENT DOCUMENTS 1020876 12/1957 Fed. Rep. of Germany ........ 74/487

Primary Examiner—Allan D. Herrmann
Attorney, Agent, or Firm—Kenneth C. Witt; J. C. Wiessler

[57] ABSTRACT

A single lever shift mechanism for shifting two control valves by selective movements of a single lever. The lever includes a spindle projecting horizontally from a vertically disposed control column and is pivoted about the axis of the control column to operate one valve. The lever also includes a handle on the spindle which is turned about the axis of the handle to provide for the operation of a second control valve.

6 Claims, 8 Drawing Figures

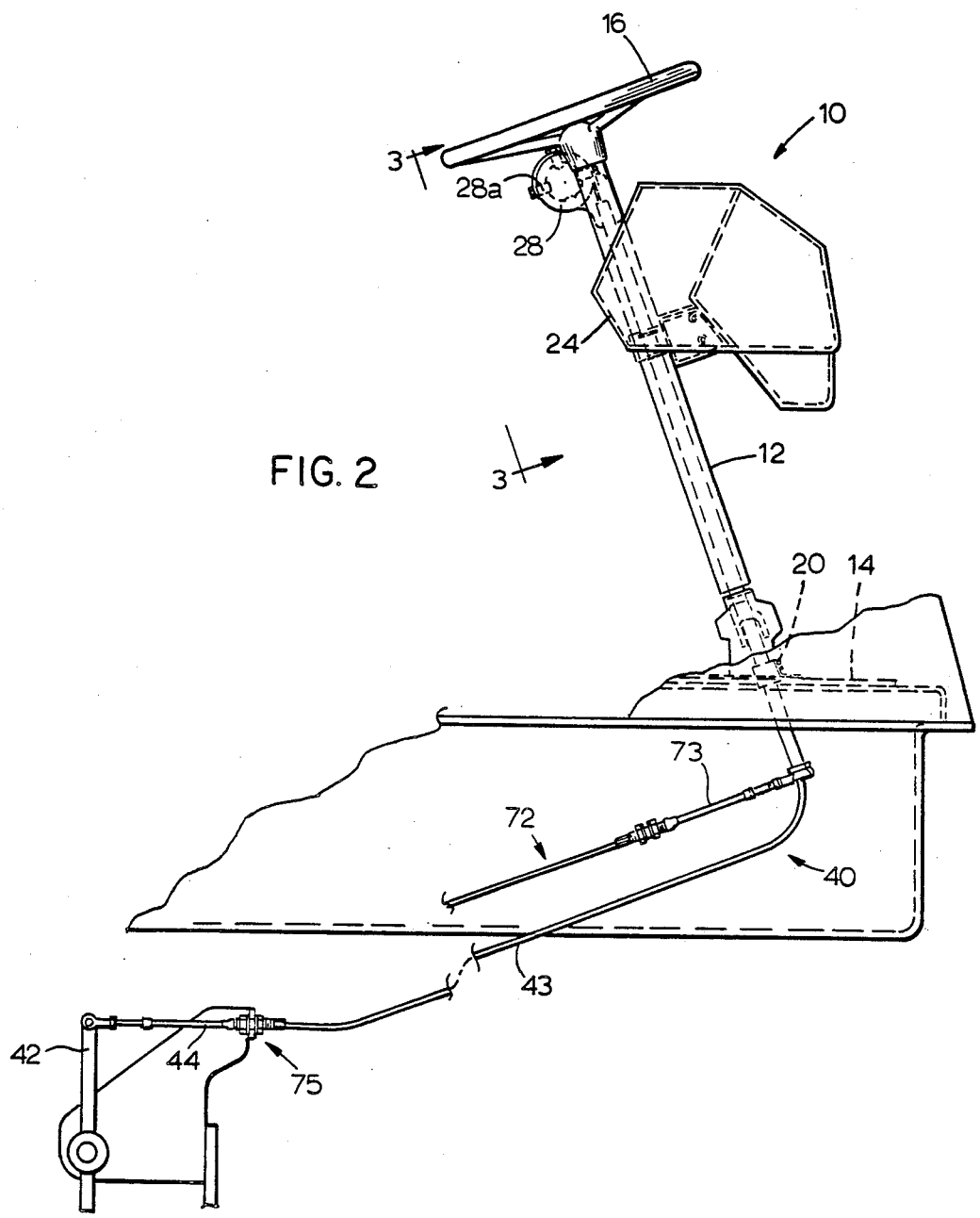

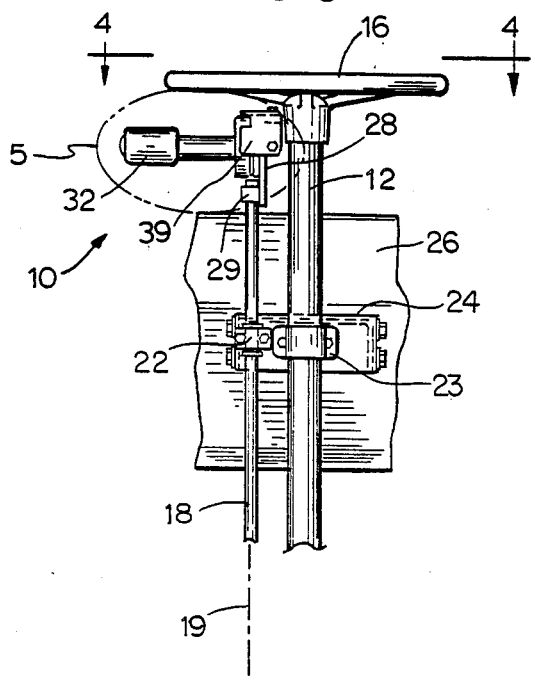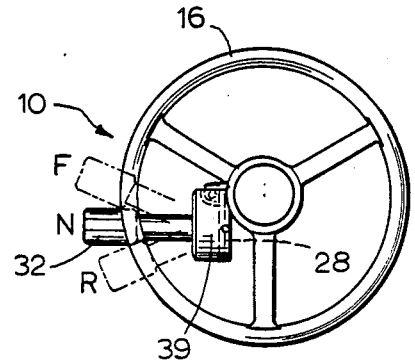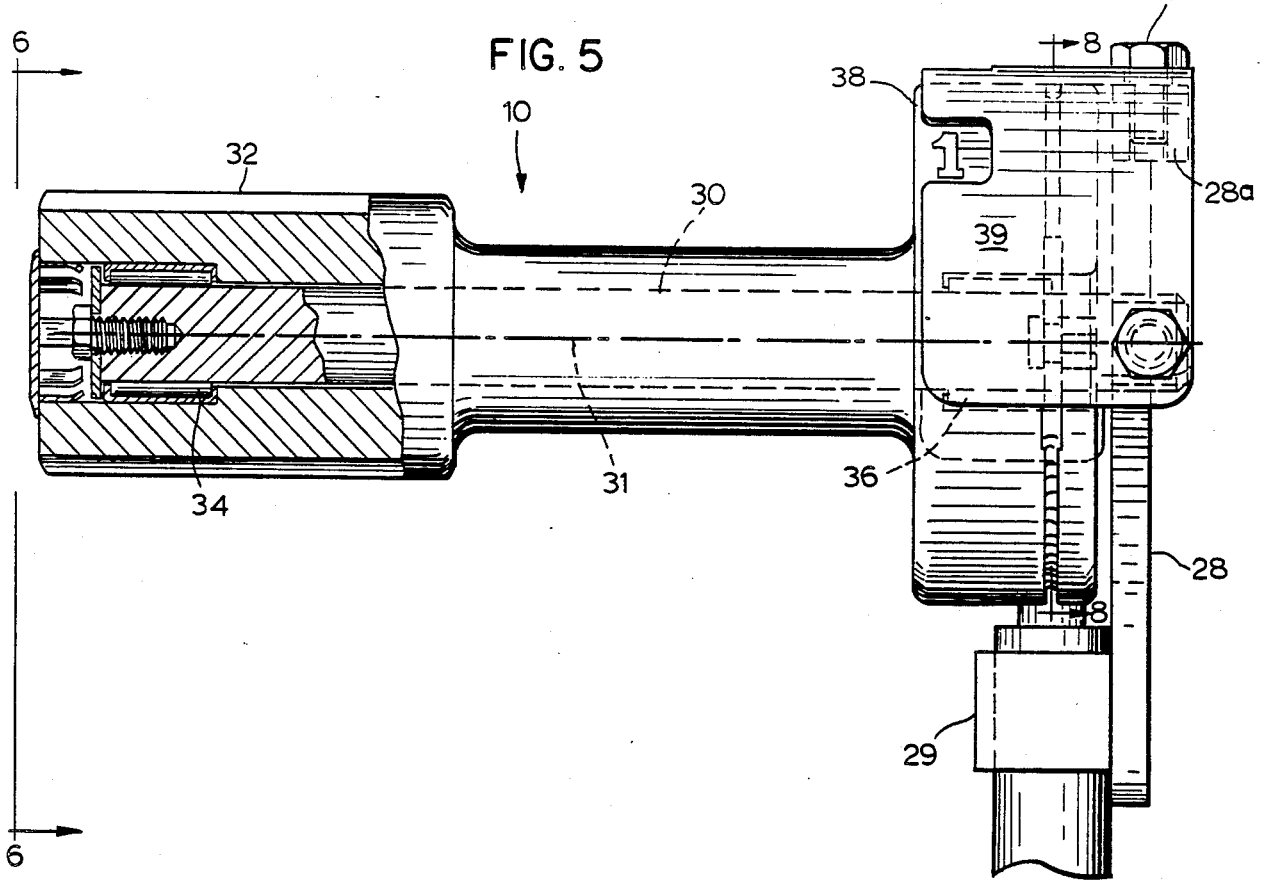

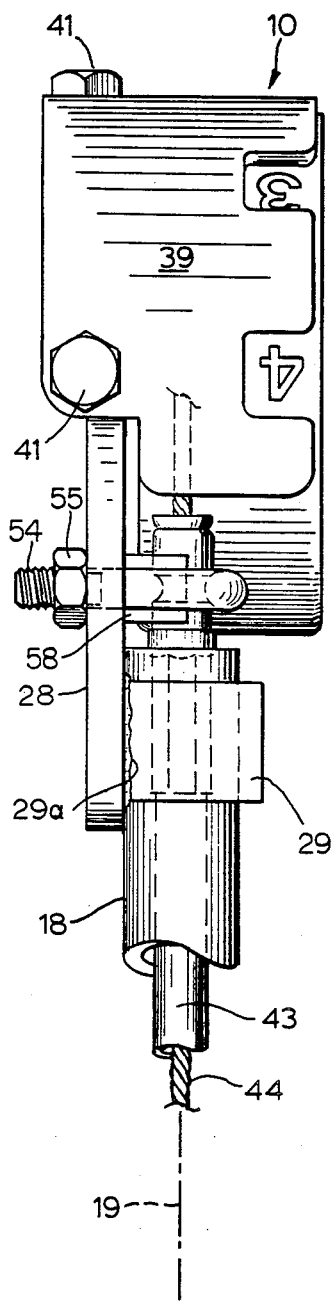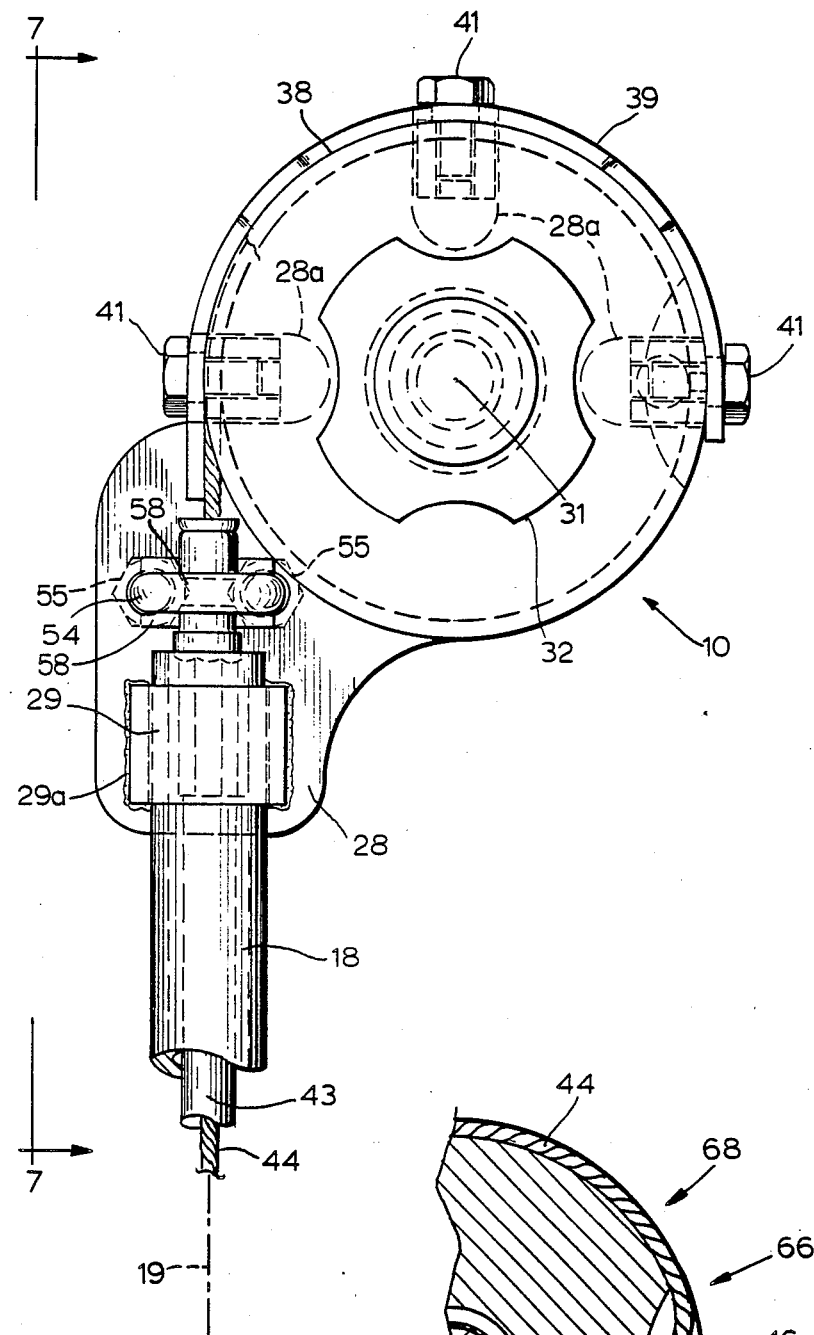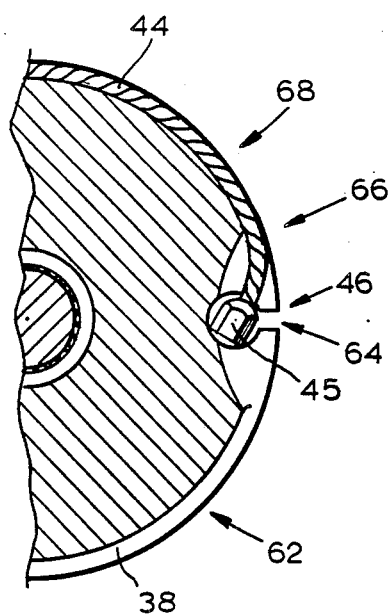

SINGLE LEVER SHIFT

BACKGROUND OF THE INVENTION

1. Field of the Invention:

This invention relates to a single lever shift mechanism for operating two valves or other control devices. An example of the use of such a mechanism is on a vehicle for operating two hydraulic valves which control a power shift transmission.

2. Description of the Prior Art:

U.S. Pat. No. 3,853,109 McAdams shows a single lever shifting mechanism for the transmission of a vehicle. The lever projects laterally from the steering column. Moving the lever forwardly and rearwardly shifts the transmission between forward, neutral and reverse. Moving the lever up and down shifts the transmission to various speed ratios. The up and down portion of the shifting mechanism allows it to move only one ratio at a time because the shift lever must be returned to neutral each time before it can advance the mechanism to the next ratio.

U.S. Pat. No. 4,297,909 Crouse shows a shift control linkage for a hydraulically controlled transmission which includes a pivotally mounted input member coupled to a direction (forward, neutral and reverse) control valve spool and a speed (first, second, third, etc.) control valve spool by first and second output links and selectively operable to various positions to the opposite sides of a neutral position to respectively select forward and reverse speeds.

SUMMARY OF THE INVENTION

In the present invention there is a tubular column member and means for supporting it on a vehicle so it can pivot about its own axis. A bracket at the upper end of the column supports a laterally extending spindle. A handle on the spindle is turned about the joint axis of the spindle and handle to shift a speed ratio valve to any one of a plurality of speed ratio positions. The column member is turned about its axis by using the handle as a lever to select among forward, neutral and reverse for a forward and reverse valve.

BRIEF DESCRIPTION OF THE DRAWING

FIG. 2 is a side elevational view of the same mechanism,

FIG. 3 is a view along the line 3—3 of FIG. 2,

FIG. 4 is a view along the line 4—4 of FIG. 3,

FIG. 5 is an enlarged view of the handle and related parts of the mechanism,

FIG. 6 is a view along the line 6—6 of FIG. 5;

FIG. 7 is a view along the line 7—7 of FIG. 6, and

FIG. 8 is a partial sectional view along the line 8—8 of FIG. 5.

DESCRIPTION OF THE PREFERRED EMBODIMENT

Figure 1:
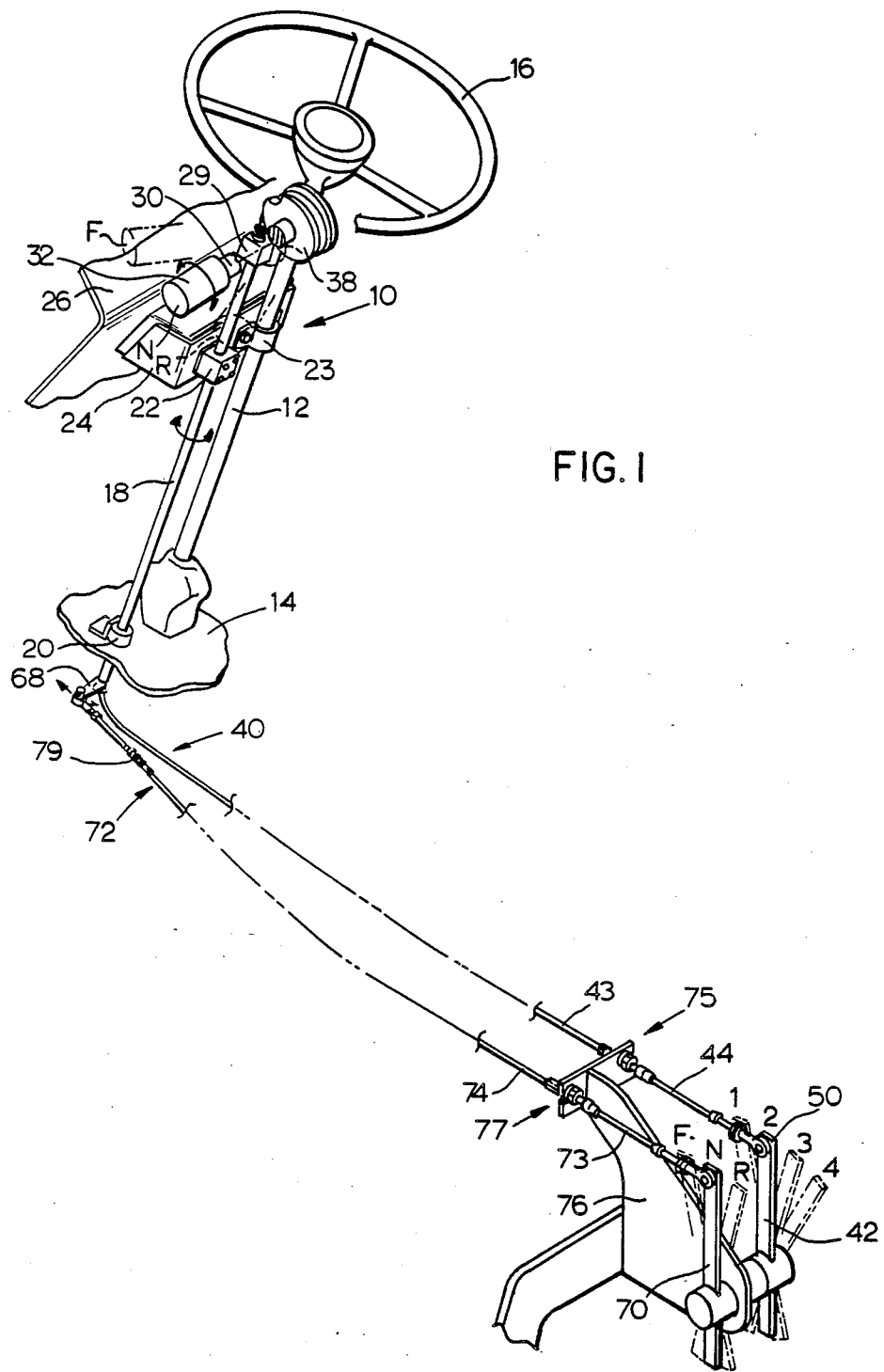
FIG. 1 is a perspective view of the mechanism of this invention.

In FIG. 1 and in the other figures the numeral 10 indicates generally a single lever shift mechanism in accordance with this invention. As shown it is mounted near a steering column 12 which extends from a vehicle floor board 14 upwardly with a steering wheel 16 mounted at the top of steering column 12. The invention includes a column member 18 which extends through and is supported by a bushing 20 at the bottom which is secured to floor board 14. The column 18 also is supported by a bracket 22 which is mounted upon a structure 24 which projects rearwardly from the pedestal or dashboard 26 of the vehicle. Column 18 is pivotable about its own axis.

At the upper end of column member 18 a bracket member 28 is secured, as by welding a collar member 29 to bracket 28 at 29a. See FIGS. 5, 6 and 7. The bracket 28 has three bosses 28a on it, one at the top and the other two 90° from the top. These three bosses are drilled and tapped and receive cap screws 41 as described later.

Mounted upon and projecting from bracket 28 is a spindle 30 which can be seen inside of handle member 32 in FIG. 5 of the drawing. The handle 32 turns about the joint axis 31 of spindle 30 and handle 32 during operation of the invention to shift a control valve operator between speed ratio positions. A pair of bearings 34 and 36 are provided between spindle 30 and handle 32 to facilitate such movement. Mounted on and movable with handle 32 is a pulley or cylinder member 38. The member 38 is housed within a fixed cylindrical shroud member 39 which is secured to bracket 28 in a suitable manner such as by cap screws 41.

A flexible cable 40 extends from near the top of column 18 to a shift lever 42 which is shown on FIG. 1 of the drawing as having four different ratio positions, one, two, three and four. As shown in FIGS. 6 and 7 flexible cable 40 comprises an outer sheath 43 and an inner wire 44 which moves longitudinally of the sheath to shift lever 42 to the desired position. As shown in FIG. 8 one end 46 of inner wire 44 is anchored by a fitting 45 in an aperture 46 in pulley 38 and extends from pulley 38 continuously to lever 42. The sheath 43 of the flexible cable is secured to bracket 28 in a suitable manner such as by means of a U-bolt 54–56 which secure sheath 43 by means of pressure applied through bracket 58. The sheath 43 also is secured at 75 to a bracket 76 which is secured to the frame of the vehicle. The cable 40 is commonly referred to in the trade as a Bowden wire. The portion of the wire 44 on cylinder 38 is held in place by shroud 39 which is secured to bracket 28.

The invention as described and illustrated herein has provision for shifting a transmission control valve among four positions. To accomplish such shifting the operator twists handle 32 about the axis 31. This moves the valve lever operator 42 to a selected one of the four positions indicated in FIG. 1. In the second position which is illustrated the inner wire is wound on to the pulley 38 so that the end 46 of the wire is located at position 64. See FIG. 8. There are three other positions 62, 66 and 68 and these correspond to transmission ratios 1, 3 and 4. It will be understood that the lever operator 42 operated by wire 44 moves to shift the control valve for the ratios of a transmission from one of the selected ratios to another. More of wire 44 winds onto pulley 38 as the handle 32 is twisted clockwise as shown in FIGS. 6 and 8 and more vire is unwound from the pulley as the handle 32 is twisted counterclockvise. There are detents, preferably in the valve, for providing four disiinct positions for the valve and the control handle 32.

To shift the transmission between forward and reverse the operator pivots the column 18 about its axis 19 by moving handle 32 either forwardly to the position designated in dashed lines in FIG. 4 as "F" for the forward position of the transmission or rearwardly as shown in the same figure for the reverse position of the transmission designated "R". The pivotal movement of handle 32 about the axis of column 18 is translated into movement of the forward and reverse valve by a direction control lever 68 which operates valve operator lever 70 by means of a flexible cable 72 similar to cable 40. The sheath 74 of cable 72 is anchored at 77 to bracket 76 which is secured to the frame of the vehicle, and a wire 73 inside sheath 74 is secured to lever 70. The sheath 74 is also secured to the structure of the vehicle at 79. When the handle is in the solid line positions illustrated in FIGS. 1 and 4 the transmission is in neutral.

In the operation of this invention the vehicle operator selects forward, neutral or reverse by using the single lever 32 to pivot column 18 about its axis. To select a speed ratio he twists handle 32 to the desired one of the four possible positions. Either selection can be made without affecting the other except, of course, if the forward reverse selector is in neutral the other selector will be ineffectual. There may be indica on pulley 38 as shown in FIGS. 5 and 7 to indicate to the vehicle operator the position of valve lever 42.

While we have described and illustrated herein a preferred embodiment of our invention which is also the best mode contemplated for carrying it out, it will be understood that changes and modifications may be made. It should be understood, therefore, that we intend to cover by the appended claims all such changes and modifications which fall within the true spirit and scope of our invention.

We claim:

1. A single lever shift mechanism for a hydraulically shifted transmission which has a ratio valve with at least two positions and a forward and reverse valve with at least two positions, comprising
    a vertically disposed column member,
    means supporting said column member on a vehicle so that it can be pivoted about its axis,
    a bracket fixed at the upper end of said column member,
    said bracket having a laterally facing surface supporting the spindle of a handle mechanism which extends laterally from said column member,
    a handle which encircles said spindle and turns about the joint axis of said spindle and said handle,
    a pulley secured to said handle confronting said bracket and having a plurality of ratio positions around the periphery of said pulley,
    a flexible cable having an outer sheath and inner wire which is movable longitudinally within the sheath,
    said sheath being secured to said bracket, and
    means for securing one end of said wire to said pulley to move between ratio positions when said handle is turned about its axis.

2. A single lever shift mechanism as in claim 1 wherein the other end of said wire is connected to a ratio valve operator.

3. A single lever shift mechanism as in claim 1 wherein said column member is tubular and said flexible cable extends through the axial opening in said tubular member.

4. A single lever shift mechanism as in claim 1 wherein said column member is connected to a forward and reverse valve operator.

5. A single lever shift mechanism as in claim 1 wherein the other end of said wire is connected to a ratio valve operator and said column member is connected to a forward and reverse valve operator.

6. A single lever shift mechanism as in claim 4 wherein said column is connected to said forward and reverse valve operator by a direction control lever on said column and a flexible cable connecting said direction control lever to said forward and reverse valve operator.

* * * * *